United States Patent Office 3,592,795
Patented July 13, 1971

3,592,795
ROOM TEMPERATURE VULCANIZABLE SILICONE RUBBER COMPOSITIONS
Bruce A. Ashby, Schenectady, N.Y., assignor to General Electric Company
No Drawing. Continuation-in-part of abandoned application Ser. No. 482,943, Aug. 26, 1965. This application Apr. 10, 1969, Ser. No. 815,206
The portion of the term of the patent subsequent to Oct. 29, 1985, has been disclaimed
Int. Cl. C08g 47/10
U.S. Cl. 260—46.5             16 Claims

ABSTRACT OF THE DISCLOSURE

Compositions vulcanizable at room temperature comprising an organic polymer such as a polyether or polyester having terminal organosilyl radicals with aminoxy radicals attached to silicon. These curable compositions can be employed as sealants and caulking compounds.

---

This application is a continuation-in-part of my co-pending application, Ser. No. 482,943, filed Aug. 26, 1965, and assigned to the same assignee as the present invention and now abandoned.

The present invention relates to room temperature curable compositions comprising organic polymer having terminal organosilyl groups with aminoxy radicals attached to silicon by silicon-oxygen linkages.

Prior to the present invention various one-package room temperature vulcanizing organopolysiloxane compositions, such as shown by Bruner Patent 3,077,465 were utilized in a variety of applications. Although cured products resulting from these compositions provide for the production of materials possessing many of the desirable characteristics of conventional organopolysiloxane elastomers, such as heat stability, low temperature flexibility, etc., these cured products often lack toughness and resistance to the effects of organic solvents.

Some product improvements have been achieved with room temperature vulcanizing materials in the form of isocyanate-terminated polymers as shown in British Patent 971,692. Experience has shown, however, that isocyanate-terminated polymers have relatively long tack-free time prior to cure.

Improvement in tack-free time and corrosiveness of the prior art room temperature vulcanizable material was achieved by the use of triaminoxy silyl-stopped polydiorganosiloxanes. The aminoxy radicals, however, cause scission of the polydiorganosiloxane chain upon prolonged storage and elevated temperatures.

The present invention is based on the discovery that certain organic polymers, specifically polyethers and polyesters substituted by aminoxy-containing silyl and polysiloxane groups provide room temperature vulcanizing compositions curable to elastomeric products having valuable characteristics. These room temperature vulcanizing compositions can be readily shaped and have a relatively short tack-free time. These room temperature vulcanizable compositions are also storable over prolonged periods without scission of the polymer chain caused by the presence of the aminoxy radical as is the case with the corresponding polydiorganosiloxanes. The cured products possess improved toughness and resistance to swell when contacted with various organic solvents. The adhesion to concrete and wood of the cured products of the present invention is far superior to the corresponding cured materials which utilize an acetoxy cure system.

Included by the curable compositions of the present invention are polyethers and polyesters substituted by aminoxysilylalkylene groups of the formula, (1) 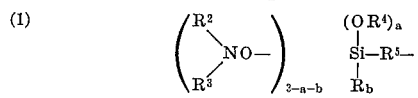

containing from 1 to 3 and preferably 1.3 to 3 aminoxy radicals per silyl group and aminoxypolysiloxanylalkylene groups of the average unit formula, (2) 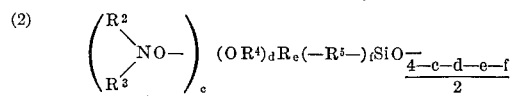

containing 3 to 5 and preferably 4 siloxy units in a branched or cyclic configuration and from one to six aminoxy radicals per polysiloxane group and preferably 4 siloxy units in a branched or cyclic configuration and preferably 1.3 to 3 aminoxy radicals per polysiloxane group. The aminoxysilylalkylene groups and aminoxypolysiloxanylalkylene groups are attached to the organic polymer through a linking radical selected from the class comprising ether, ester, carbonate, urethane and urea containing radicals. The linking radicals in combination with the $R^5$ radical of the aminoxysilylalkylene and polysiloxanylalkylene groups are selected from the group consisting of

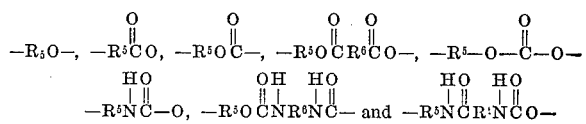

Radicals included by R having up to 18 carbon atoms are selected from the group consisting of mononuclear and binuclear aryl radicals, such as phenyl, naphthyl, biphenyl, etc.; halogenated mononuclear and binuclear aryl radicals, e.g., chlorophenyl; mononuclear aryl lower alkyl radicals, e.g., benzyl, phenylethyl; lower alkyl radicals, e.g., methyl, ethyl, propyl, butyl, octyl; cyano lower alkyl radicals, e.g., cyanoethyl, cyanopropyl; cycloalkyl radicals having 5 to 7 carbon atoms in the ring, e.g., cyclopentyl, cyclohexyl, cycloheptyl and halo lower alkyl radicals, e.g., trifluoropropyl, fluorobutyl, chloromethyl. The prefix "lower" used to modify radicals indicates that the alkyl groups of the radicals each have 8 or fewer carbon atoms. Alkyl radicals included by $R^2$ and $R^3$ are the same group of alkyl radicals and haloalkyl radicals as R, and in addition $R^2$ and $R^3$ can together form a divalent alkylene or divalent alkylene ether radical which forms a heterocyclic ring with the N of the aminoxy radical. The divalent alkylene radical is selected from the class of radicals containing from 2 to 20 carbon atoms, and can include alkylene radicals attached to arylene radicals directly and to other alkylene radicals through an ether bridge, e.g., $(CH_2)_2$, $(CH_2)_4$, $(CH_2)_8$, $(CH_2)_2$—O—$(CH_2)_2$ Radicals included by $R^5$ are lower alkylene having two to 8 carbon atoms for example, ethylene, trimethylene; halo lower alkylene such as chloroisopropylene, fluorobutylene, etc., mononuclear and binuclear arylenearalkylene such as phenylethylene, naphthalethylene, etc., haloarylethylene such as chlorophenylethylene, alkyleneoxyarylene radicals such as ethyleneoxyphenylene, etc.; alkyleneoxyalkylene such as ethyleneoxypropylene, etc., aryleneoxyarylalkylene, such as phenyleneoxyphenylethylene and saturated cycloalkylene radicals such as cyclobutylene, cyclopentylene and cyclohexylene. Radicals represented by $R^6$ are selected from the same group as the $R^5$ radicals and in addition can include mononuclear and binuclear arylene. Radicals included by $(OR^4)$ are for example, lower alkoxy having one to 8 carbon atoms such as methoxy, ethoxy, propoxy, tert-butoxy and halogenated derivatives thereof, e.g., chloromethoxy and preferably beta-chloroisopropoxy and beta-beta-dichloroisopropoxy. In the above Formulas 1 and 2, $a$ has a value of 0 to 2, $b$ has a value of 0 to 2, and the sum of $a+b$ has a value of 0 to 2 and is preferably 1.4, $c$ has a value of 0.1 to 2.5, $d$ has a value of 0 to 2, $e$ has a value of 0 to 2 and the sum of $d+e$ has a value of 0 to 2, and $f$ has a value of 0.20 to 0.33. In the above formulas, where R, $R^2$, $R^3$, $R^4$, $R^5$ and $R^6$ can represent more than one radical respectively, these radicals can be all the same or any two or more of the aforementioned radicals.

Organic polymer included by the present invention having terminal organosilyl groups with aminoxy radicals attached to silicon can be made by effecting reaction between a hydroxyl amine of the formula,

and a polyether or polyester having terminal organosilyl groups consisting of the intermediate divalent organo radicals previously described and chemically combined thereto, silylalkylene radicals of the formula, (3)

or a branched or cyclic polysiloxanylalkylene group having 3 to 5 and preferably 4 siloxy units of the formula, (4)          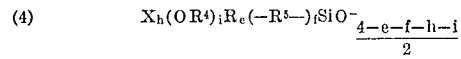

where R, $R^2$, $R^3$, $R^5$, $OR^4$, $b$, $e$ and $f$ are as above defined, X is a member selected preferably from hydrogen and alkoxy but also from halogen in the presence of an acid acceptor, $g$ has a value of 0 to 3, $h$ has a value of 0 to 2.5, $i$ has a value of 0 to 2.5, and the sum of $h+i$ has a value of 0.1 to 2.5.

Organic polymer having terminal silylalkylene and siloxanylalkylene radicals of Formulas 3 and 4 can be made by effecting reaction between silicon hydride of the formula, (5)

or a branched or cyclic polysiloxane having 3 to 5 siloxy units and preferably 4 siloxy units of the formula, (6)          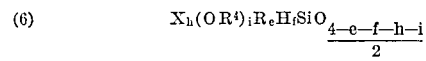

and organic polymer described hereinafter, having terminal olefinically unsaturated organo radicals selected from alkenyl-containing radicals having 2 to 20 carbon atoms and cycloalkenyl-containing radicals of from 3 to 20 carbon atoms.

Some of the methods which can be employed for making organic polymer having terminal silyl radicals of Formula 1 and polysiloxane radicals of Formula 2 include reacting SiH or Si(OR⁴) containing polymers with hydroxylamine of the formula,

Reaction between polymers containing halosilyl groups and a hydroxylamine may also be employed if an acid acceptor is present but this is not a preferred method.

Polyesters and polyethers having terminal organosilylalkylene groups of Formula 1 and polysiloxanylalkylene groups of Formula 2 can be made by effecting contact between a silicon hydride of Formula 5 or a polysiloxane of Formula 6 and a polyester or polyether having terminal olefinically unsaturated radicals. The addition can be effected in the presence of a catalyst such as metallic platinum, a platinum salt, a platinum compound or a platinum complex, all of which are well known in the art.

Various methods can be employed for making organic polymer such as polyether or polyester with terminal olefinically unsaturated organo radicals to provide for the production of organic polymer having terminal groups of Formulas 1 and 2. For example, organic polymer such as polyether or polyester, having terminal olefinically unsaturated organo radicals attached to the organic polymer by urethane linkages, can be made by methods shown in my Patent 3,408,321, assigned to the same assignee as the present invention. In this patent, olefinically unsaturated radicals can be joined to organic polymer with urethane linkages by employing olefinically unsaturated isocyanates, or diisocyanates and olefinically unsaturated alcohols. These isocyanates and olefinically unsaturated alcohols also can be employed in the practice of the present invention.

Organic polymer having terminal olefinically unsaturated organo radicals attached to carbonate linkages can be made by phosgenating a mixture of a polyester or polyether having terminal hydroxy radicals and an olefinically unsaturated compound, (7)          $R^7OH$ where $R^7$ is an olefinically unsaturated monovalent hydrocarbon radical, such as allyl, cyclohexenyl and styryl. Formula 7 includes for example, allyl alcohol, cyclohexeno, and p-allylphenol. Similarly, unsaturated esters of haloformic acid also can be employed for reaction with the hydroxy-terminated polyester or polyether.

Organic polymer having terminal olefinically unsaturated ester linkages can be made by effecting contact between the organic polymer, and a monocarboxylic acid having terminal olefinically unsaturated linkages. For example, propenoic acid, methyl propenoic acid, 2-4-hexadienoic acid, oleic acid, etc.

Dicarboxylic acids utilized in combination with olefinically unsaturated alcohols included by Formula 7 also can be employed when it is desired to join the silyl group through a diester linkage to the polymer chain. When a monoester linkage is desired, a carboxy alkyl silane can be reacted with a hydroxyl stopped polymer, or a hydroxy alkyl silane can be reacted with a polymer containing terminal carboxyl groups.

Silyl groups may be attached through alkylene ether bridges to polyesters or polyethers by the Williamson reaction. This involves first reacting a hydroxyl stopped polyester or polyether with sodium to replace the hydrogen of the hydroxyl group with sodium. This in turn is reacted with a chloroalkylsilane to produce the desired bridge.

Another method for attaching the silyl groups is to add polyethers having unsaturated terminal groups to SiH containing compounds using one of the afore-described platinum metal or platinum compound catalysts.

In lieu of employing an SiH-olefin addition reaction to attach silicon to a polyester or polyether, other methods may be employed to achieve the result. For example, an aminoalkyltrialkoxysilane can be reacted with a two-fold excess of toluene diisocyanate to produce an isocyanate terminated silyl compound. This in turn can be reacted with a polyester or polyether having terminal hydroxyl groups to produce polyesters or polyethers containing silyl groups attached to the polymer chain through urea urethane linkages. The order of reaction may be reversed and an excess of a diisocyanate can be added to a polyester or polyether containing hydroxy terminal gorups to produce polyesters of polyethers containing terminal isocyanate groups. These in turn can be reacted with aminoalkyltrialkoxysilanes to produce polymers having silyl groups.

When it is desired to attach the silyl radical through a single urethane radical to the polymer chain, this can be accomplished by reacting an isocyanatoalkylsilane with a polymer containing hydroxyl groups. The isocyanate reacts with the hydroxyl groups to form urethane linkages. A method of preparing the isocyanatoalkylsilanes is found in patent application, Ser. No. 669,298 of Abe Berger assigned to the same assignee as the present invention. This method involves pyrolysis of the corresponding carbamate. The carbamate is made by effecting reaction between a silyl organo halide, a metal cyanate and an aliphatic monohydric alcohol in the persence of an aprotic solvent.

Hydroxyl amines which may be employed to make the room temperature vulcanizable polymers of the present invention are for example, heterocyclic hydroxyl amines such as N-hydroxypyrrolidine, N-hydroxyethyleneimine, N-hydroxypiperidine, N-hydroxymorpholine, and diorgano-substituted hydroxyl amines such as the N,N-dimethyl-, diethyl-, diisopropyl-, dipropyl-, dibutyl-, dipentyl-, dihexyl-, dicyclohexyl-, methylethyl-, methylpropyl-, methylbutyl-, diphenyl-, ditolyl-, methylphenyl-, and methylnaphthylhydroxyl amines.

Included by the silicon and polysiloxane hydrides of Formulas 5 and 6 are silanes such as methylsilane, dimethylsliane, phenylsilane, diphenylsilane; alkoxy silanes such as triethoxysilane, methyldiethoxysilane, phenyldimethoxysilane, branched or cyclic siloxanes having 3 to 4 and preferably 4 siloxy units of the formulas, $$\left(\underset{R}{\overset{R}{HSiO}}\right)_{3-b}\overset{R_b}{-}SiH, (RHSiO)_3, \text{ and } (RHSiO)_4$$

for example, silicon hydrides such as

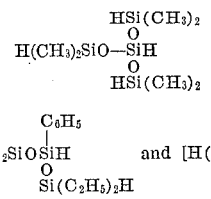

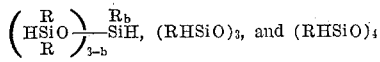
and [H(CH$_3$)SiO]$_4$

The branched and cyclic siloxanes are used because they resist scission caused by the presence of the aminoxy radicals far better than linear polysiloxanes. Methods of making silicon hydrides are shown by A. L. Smith, Spectrochim Acta, (1959), 4–2–20.

The polyethers and polyesters which can be employed as organic polymers to provide for the production of the curable compositions of the present invention are well known commercially available materials. These polyesters and polyethers usually have terminal hydroxy radicals though in some cases the polyesters have terminal carboxyl groups and are preferably free of olefinic unsaturation though unsaturation can be tolerated. The polyethers which can be utilized consist essentially of chemically combined ether units such as taught on pages 32–44 of Polyurethanes Chemistry and Technology, J. H. Saunders and K. C. Frisch, Interscience Publishers, New York (1962). Polyethers which can be employed can be made from source materials such as ethylene oxide, propylene oxide, epichlorohydrin, tetrahydrofuran, etc. For example, one procedure which can be used is to effect reaction between propylene oxide, epichlorohydrin, etc., and an alkylene glycol, such as propylene glycol, or a fluorinated alkylene glycol, etc. in the presence of a base catalyst, such as anhydrous sodium hydroxide. Some of the chemically combined units which are included by the above ether units are for example,

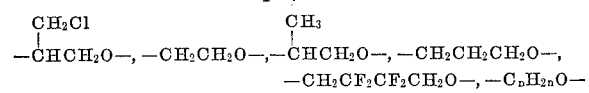

etc., where $n$ is an integer equal to 2 to 6, inclusive, and preferably 2 to 4. The ether units may be the same or mixed and there may be some chain branching in the polyether molecule. Of the polyalkylene glycol, polypropylene glycol is preferred. Polyethers and polyesters having a molecular weight of between 300 to 12,000 and preferably 1,000 to 2,000 can be utilized. Viscosities up to $2 \times 10^6$ centipoises at 25° C. can be employed in the practice of the invention. The preferred viscosity range is from 600 centipoises to 400,000 centipoises.

Polyester which can be utilized in the practice of the invention can be linear or branched. The polyester can be produced by effecting reaction between a polycarboxylic acid and a polyhydric alcohol. The polyester can have terminal radicals selected from hydroxy radicals, a mixture of hydroxy and carboxy radicals, or carboxy radicals. Some of the polycarboxylic acids which can be employed in making the polyesters operable in the invention are oxalic acid, malonic acid, succinic acid, glutaric acid, adipic acid, palmitic acid, suberic acid, azelaic acid, sebacic acid, phthalic acid, isophthalic acid, terephthalic acid, halogenated phthalic acid, etc. Glycols which can be employed to make the polyesters utilized in the practice of the invention include 1,4-cyclohexanedicarbinol, ethylene glycol, diethylene glycol, triethylene glycol, etc., propylene glycol, 1,3-butylene glycol, 1,4-butylene glycol, isomers of dihydroxybenzene, bis-phenols, such as diphenylolpropane, halogenated bis-phenols, etc. Mixtures of glycols and triols, such as glycerine, 1,2,6-hexanetriol, trimethylolpropane, pentaerythritol, etc., also can be employed in combination with any one or more of the aforementioned acids. Esterification and transesterification methods for making these polyesters are well known. A method which can be employed is described on pages 45–48 of "Polyurethanes Chemistry and Technology" as previously cited. Organic polymer having terminal hydroxy radicals, or a mixture of hydroxy and carboxy radicals also can be employed consisting of blocks of polyether, polyester or mixtures thereof joined by urethane linkages.

In accordance with the practice of the invention, polymers having terminal organosilyl groups utilized in the practice of the present invention can be made by a stepwise procedure. Reaction can be effected between the hydroxyl amine and organic polymer having terminal silanic hydrogen or alkoxy-substituted silyl radicals in accordance with any one of the various procedures illustrated in the previously mentioned copending application of R. A. Murphy, and more particularly illustrated in the examples shown hereinafter, depending upon the nature of the radicals attached to silicon of the terminal silyl radicals. For example, contact between the hydroxyl amine and organic polymer having terminal silyl radicals with hydrogen attached to silicon can best be effected at temperatures between 25° C. to 100° C. Where the hydrolyzable radical is alkoxy, temperatures between 25° C. to 130° C. can be employed.

Experience has shown that the curable compositions of the present invention can remain stable for at least 6 months or more at a temperature in the range of between 0° C. to 100° C., if there are present no more than 100 parts of water, per million parts of composition. Well known procedures can be employed to minimize the presence of water in the final composition. For example, the reactants such as polyester can be dried by azeotroping out water by use of toluene, etc. Mixing of the ingredients can be performed under an inert gas atmosphere such as nitrogen, etc.

The curable compositions of the present invention can contain curing accelerators, such as stannous octoate, dibutyl tin dilaurate, stannous oleate, which can be utilized in amounts of about 0.001 percent to 10.0 percent, by weight of composition. Fillers also can be utilized in proportions up to about 50 parts of filler per 100 parts of composition. For example, filler such as carbon black, diatomaceous earth, fumed silica, etc., can be employed. Reinforcing materials, such as silicon carbide whiskers, glass fibers, etc., can be utilized. In addition, pigments, heat stabilizers, plasticizers, also can be employed.

The curable compositions of the present invention can be utilized in sealing and caulking applications, in roof construction, as an encapsulating and potting compound, etc.

In order that those skilled in the art will be better able to practice the present invention, the following examples are given by way of illustration and not by way of limitation. All parts are by weight.

EXAMPLE 1

There were added 43.5 parts of allylisocyanate to 200 parts of a polypropylene glycol having a molecular weight of about 700, followed by the addition of 0.6 part of dibutyl tin dilaurate. The mixture was heated at a temperature of 100° C. for 2 hours. An infrared spectrum of a sample of the resulting product showed it was free of hydroxyl groups. To 70 parts of this product, there was added 0.004 part of platinum as a platinum-ethylene complex and 29 parts of tris-(dimethylsiloxy)silane. There was then added to the resulting product 32.7 parts of diethylhydroxyl amine. A reaction occurred resulting in the evolution of hydrogen. There was obtained a polypropylene glycol having terminal silyl urethane groups of the formula,

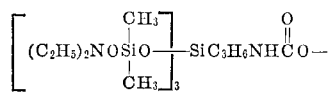

The above silyl urethane terminated polypropylene glycol was poured onto a tin plate and exposed to the atmosphere. A tack-free product was produced in less than two hours. After 72 hours a cured sheet was obtained which had valuable elastomeric and insulating properties.

EXAMPLE 2

Following the procedure of Example 1, 53.9 parts of bis-(dimethylsiloxy)methylsilane were added to 121 parts of the allyl urethane-terminated polypropylene glycol in the presence of 0.003 part of platinum. There were then added 46.6 parts of diethylhydroxylamine to the resulting product. The resulting mixture was allowed to warm to a temperature of 41° C. A polymer was obtained having terminal

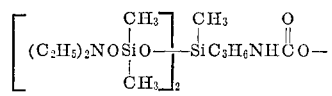

groups. It was poured onto a tin plate and exposed to the atmosphere. A tack-free product was obtained in less than two hours. After 72 hours the cured product showed a tensile (p.s.i.) of 51 pounds, an elongation (percent) of 20, and a hardness (Shore A) of 48.

EXAMPLE 3

An allyl urethane-stopped polyether was prepared in accordance with the procedure of Example 1 from 25.1 parts of allylisocyanate, 200 parts of polypropylene glycol having a molecular weight of about 1300 an 0.08 part of dibutyl tin dilaurate. There were than added at 100° C. to the resulting alkylene-terminated polymer, 32.6 parts of dimethoxymethylsilane and 0.007 part of platinum in the form of the complex of Example 1. When infrared analysis indicated the resulting mixture was free of silicon hydride, 53.7 parts of diethylhydroxylamine were added. The mixture was then heated to effect the removal of 12.8 parts of methanol. There was obtained a polypropylene glycol having terminal silyl urethane groups of the formula,

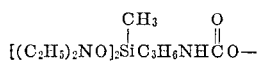

There were mixed in the absence of moisture, 260 parts of the above silyl urethane-terminated polymer and 30 parts of fumed silica. The resulting formulation was placed in an A.S.T.M. mold under a sheet of wet paper for 60 hours. A slab was cut from the resulting cured sheet having about an 80 mil thickness. It showed a tensile (p.s.i.) of 161, an elongation (percent) of 89, and a hardness (Shore A) of 36.

EXAMPLE 4

A polyether having terminal olefinically unsaturated carbonate linkage was prepared at room temperature by effecting reaction between 300 parts of the polyether of Example 1, and 35.7 parts of allylchloroformate in the presence of 200 parts of toluene and 23.4 parts of pyridine. The components of the mixture were allowed to react about 8 hours. The mixture was then washed with water and stripped to remove solvent. The residue was redissolved in ether and washed with dilute HCl and dilute Na$_2$CO$_3$ solution and the solvent was stripped.

There were added at 100° C. to a mixture of 298 parts of the above polyether having terminal olefinic unsaturation and 200 parts of toluene, 0.006 part of platinum in the form of a platinum-ethylene complex, and 28.8 parts of methyldimethoxysilane. When infrared analysis showed the resulting mixture was free of silicon hydride, 48.4 parts of diethylhydroxyl amine were added. The mixture was then heated to effect the removal of methanol. There were obtained 330 parts of product upon stripping the residue of residual solvent. Based on method of preparation, the product was a polyether having terminal silylalkylene carbonate groups of the formula,

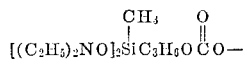

The surface of the product was tack-free in about one minute when it was poured onto a tin plate and exposed to the atmosphere. The cured elastomer showed valuable insulating and elastomeric properties.

EXAMPLE 5

A mixture of a polyester having terminal allyl urethane groups and a methylpolysiloxane consisting essentially of chemically combined dimethylsiloxy units and a minor amount of methyl hydrogen siloxy units is heated for 3 hours at a temperature of 100° C. in the presence of an effective amount of a platinum-ethylene complex.

The methylpolysiloxane consists essentially of chemically combined dimethylsiloxy units, and a minor amount of methyl hydrogen siloxy units; it is prepared by equilibrating for 4 hours at 90° C., a mixture of 660 parts of octamethylcyclotetrasiloxane, 113 parts of 1,3,5,7-tetramethyl-1,3,5,7-tetrahydrocyclotetrasiloxane and 91 parts of hexamethyldisiloxane in the presence of 10 parts of acid treated diatomaceous earth. The mixture is then cooled and filtered.

The polyester having terminal allyl urethane groups is prepared by heating a mixture of 200 parts of a polyester of diethylene glycol and adipic acid having a molecular weight of 1170 and 28.4 part of allylisocyanate for 2 hours at 100° C. in the presence of 0.06 part of dibutyl tin dilaurate.

There are added 17.8 parts of diethylhydroxylamine to the reaction product of 66.6 parts of the above-described polyester having terminal allyl urethane groups and 150 parts of the above-described methylpolysiloxane in the presence of 0.002 part of platinum-ethylene complex. Hydrogen is evolved. A polyeser is obtained having terminal silylpropylene urethane groups with a methylpolysiloxane attached to silicon of said silyl urethane groups consisting essentially of chemically combined dimethylsiloxy units and a minor amount of methylsiloxy units with diethylaminoxy radicals attached to silicon-oxygen by silicon-oxygen linkages. The product rapidly cures to a solid under atmospheric conditions when poured out onto a tin plate. It exhibits valuable sealant and insulating properties.

Based on the above results, those skilled in the art would know that the room temperature curable compositions provided by the present invention provide for the production of valuable sealants and insulating material having valuable elastomeric characteristics.

EXAMPLE 6

A mixture of 500 parts of a polyethylene glycol having a molecular weight of 1300 and 800 parts of toluene was heated to azeotrope water from the mixture. There was then added 135 parts of toluene diisocyanate and about 0.3 part of dibutyl tin dilaurate. The mixture was refluxed until a portion of the mixture showed it was free of hydroxyl groups based on its infrared spectrum. The mixture was allowed to cool to room temperature. Based on method of preparation, the resulting product is a polyethylene glycol having terminal isocyanate radicals.

A mixture of 321 parts of gamma-aminopropyltriethoxysilane and 388 parts of diethylhydroxylamine was refluxed at atmospheric pressure. There was then distilled from the mixture at 120° C. and 240 mm. torr, 146 parts of ethanol. There was also stripped from the resulting mixture, 186 parts of diethylhydroxylamine. There was obtained 365 parts of an aminoxyethoxyaminopropylsilane.

A curable composition was prepared by stirring 5 parts of the above isocyanate terminated polyethylene glycol with one part of the above aminoxyethoxyaminopropylsilane. Based on method of preparation, there was obtained a curable composition consisting of a polyethylene glycol having terminal silylpropyluredo linkages with aminoxy and ethoxy radicals attached to silicon. The curable composition became tack-free in fifteen minutes when it was contacted with moist air.

EXAMPLE 7

A mixture of 650 parts of a polypropylene glycol having a molecular weight of 1300 and 800 parts of toluene is heated to azeotrope water from the mixture. The mixture was then cooled. To the cooled mixture was added 2 parts of dibutyl tin dilaurate and 191 parts of isocyanatopropyltrimethoxysilane. The reaction mixture was stirred at room temperature for 1½ hours until the infrared spectrum showed the absence of absorption due to isocyanate radicals. Then 180 parts of dry diethylhydroxylamine was added. Heat was applied and methanol was distilled overhead and collected until approximately 46 parts were recovered a 40° C. to 50° C. at 200 mm. Hg abs.

The reaction liquid was stable as long as it remained in a sealed container and cured to a hard, elastomeric material in about 3 minutes when exposed to atmospheric moisture. It was tested as a room temperature vulcanizable adhesive and performed well.

EXAMPLE 8

A mixture of 650 parts of a polypropylene glycol having a molecular weight of 1300 and 800 parts of toluene is heated to azeotrope water from the mixture. The mixture was then cooled. To the cooled mixture was added 2 parts of dibutyl tin dilaurate and 191 parts of isocyanatopropyltrimethoxysilane. The reaction mixture was stirred at room temperature for 1½ hours until the IR spectrum showed the absence of absorbance due to isocyanate radicals being present. Then 89 parts of dried diethylhydroxylamine was added. Heat was applied and methanol was distilled overhead and collected until approximately 46 parts were recovered at 40 to 50° C. at 200 mm. Hg abs.

The product was stripped at room temperature on a rotary evaporator to remove the solvent. The product was tested as a room temperature vulcanizable adhesive and cured in 1 1/16 hours when exposed to atmospheric moisture. The hydrolyzable groups on the silyl group of the product were aminoxy radicals and methoxy radicals. The cure time of the product can be varied by varying the ratios of these hydrolyzable groups, i.e., as is shown by comparing Examples 7 and 8. The higher the ratio of aminoxy radicals to the number of aminoxy plus alkoxy radicals the faster the cure time.

While the foregoing examples have of necessity been limited to only a few of the very many variables within the scope of the present invention, it should be understood that the present invention is directed to a much broader class of curable compositions comprising organic polymers having terminal silyl radicals of Formulas 1 and 2. These compositions can be made by effecting reaction between organic polymers having terminal silylalkylene or siloxanylalkylene groups of Formulas 3 and 4 and hydroxyl amine. It also is understood that the present invention is directed to a method for making the curable compositions of the present invention involving the use of a variety of conditions and reactants shown in the foregoing description involving the employment of the organic polymer having terminal radicals of Formulas 3 and 4 and hydroxyl amine.

What I claim as new and desire to secure by Letters Patent of the United States is:

1. A polymer having a molecular weight of between about 300 to 12,000 selected from the class consisting of polyether and polyester having at least one radical selected from the class consisting of aminoxy silylalkylene radicals of the formula, (1) 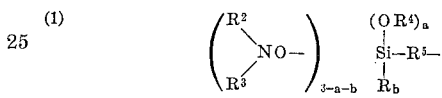

and aminoxy polysiloxanylalkylene radicals of the average unit formula, (2) 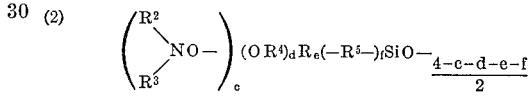

containing 3 to 5 siloxy units in a branched or cyclic configuration which is directly attached to said polymer in a terminal position by a linkage in combination with the $R^5$ radical of the aminoxy silylalkylene and aminoxypolysiloxanylalkylene radicals selected from the class consisting of

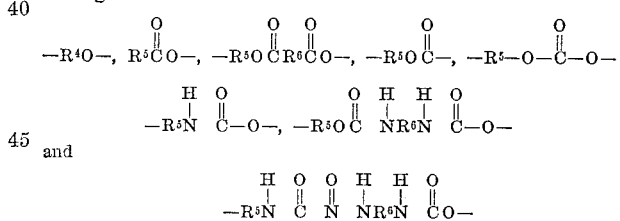

and $$-R^5N\overset{H}{\underset{|}{}}\overset{O}{\underset{||}{C}}\overset{}{N}NR^6N\overset{H}{\underset{|}{}}\overset{O}{\underset{||}{C}}O-$$

where R is selected from the group consisting of mononuclear and binuclear aryl radicals, halogenated mononuclear and binuclear aryl radicals, mononuclear aryl lower alkyl radicals, lower alkyl radicals, cyano lower alkyl radicals, and halo lower alkyl radicals; $R^2$ and $R^3$ are selected from the group consisting of mononuclear and binuclear aryl radicals, halogenated mononuclear and binuclear aryl radicals, mononuclear aryl lower alkyl radicals, lower alkyl radicals, cyano lower alkyl radicals, cycloalkyl radicals having 5 to 7 carbon atoms in the ring, and halo lower alkyl radicals, and in addition $R^2$ and $R^3$ can together form a divalent alkylene or divalent alkylene ether radical which forms a heterocyclic ring with the nitrogen atom of the aminoxy radical; $R^5$ is selected from the group consisting of lower alkylene, halo lower alkylene, mononuclear aralkylene and binuclear aralkylene, halo aralkylene, alkyleneoxyalkylene, aryleneoxyaralkylene, and saturated cycloalkylene; $R^6$ is selected from the group consisting of lower alkylene, halo lower alkylene, mononuclear aralkylene and binuclear aralkylene, halo aralkylene, alkyleneoxyalkylene, aryleneoxyaralkylene, and saturated cycloalkylene, and mononuclear and binuclear arylene radicals; ($OR^4$) is selected from the group consisting of lower alkoxy radicals, and halogenated derivatives thereof; $a$ has a value of 0 to 2, $b$ has a value of 0 to 2, and the sum of $a+b$ has a value of 0 to 2, c has a value of 0.1 to 2.5, d has a value 0 to 2, e has a value of 0 to 2, and the sum of $d+e$ has a value of 0 to 2, and f has a value of from 0.20 to 0.33.

2. The composition of claim 1, wherein the aminoxy silyl group contains from 1.3 to 3 aminoxy radicals per silyl group.

3. The composition of claim 1, wherein the aminoxy-polysiloxane group contains from 1.3 to 3 aminoxy radicals per polysiloxane group.

4. The composition of claim 1, wherein the linking radical has the formula

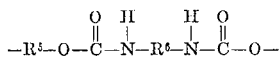

5. The composition of claim 1, wherein the linking radical has the formula

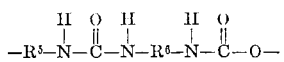

6. The composition of claim 1, wherein the linking radical has the formula

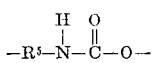

7. A curable composition in accordance with claim 1, containing a filler.

8. A curable composition in accordance with claim 1, where said organic polymer is a polyether.

9. A curable composition in accordance with claim 1, where said organic polymer is a polyester.

10. A curable composition in accordance with claim 1, where the aminoxy radicals are diethylaminoxy radicals.

11. A composition within the scope of claim 1, where the polysiloxane group is a cyclotetrasiloxane.

12. A composition of claim 1, wherein the aminoxy polysiloxanylalkylene radical has the formula,

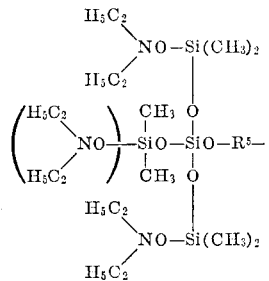

13. The composition of claim 1, where the viscosity of the polymer is less than $7 \times 10^6$ centipoises.

14. The composition of claim 1, where the viscosity of the polymer is from 600 centipoises to 400,000 centipoises.

15. The composition of claim 1, where the polymer is linear.

16. A polymer having a molecular weight of between about 3,000 to 12,000 selected from the class consisting of polyether and polyester having at least one radical selected from the class consisting of aminoxy silylalkylene radicals of the formula, (1) 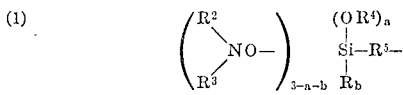

and aminoxy polysiloxanylalkylene radicals of the average unit formula, (2) 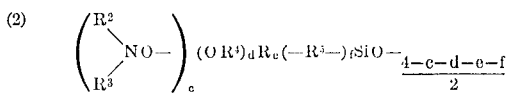

containing 3 to 5 siloxy units in a branched or cyclic configuration which is directly attached to said polymer in a terminal position by a linkage in combination with the $R^5$ radical of the aminoxy silylalkylene and aminoxy polysiloxanylalkylene radicals selected from the class consisting of

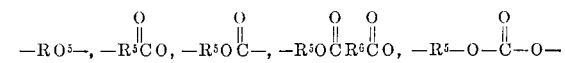

where R is selected from the group consisting of mononuclear and binuclear aryl radicals, halogenated mononuclear and binuclear aryl radicals, mononuclear aryl lower alkyl radicals, lower alkyl radicals, cyano lower alkyl radicals, and halo lower alkyl radicals, $R^2$ and $R^3$ are selected from the group consisting of mononuclear and binuclear aryl radicals, halogenated mononuclear and binuclear aryl radicals, mononuclear aryl lower alkyl radicals, lower alkyl radicals, cyano lower alkyl radicals, cycloalkyl radicals having 5 to 7 carbon atoms in the ring and halo lower alkyl radicals, and in addition $R^2$ and $R^3$ can together form a divalent alkylene or divalent alkylene ether radical which forms a heterocyclic ring with the nitrogen atom of the aminoxy radical; $R^5$ is selected from the group consisting of lower alkylene, halo lower alkylene, mononuclear and binuclear aralkylene, halo aralkylene, alkyleneoxyalkylene, aryleneoxyaralkylene, and saturated cycloalkylene; $R^6$ is selected from the group consisting of lower alkylene, halo lower alkylene, mononuclear aralkylene and binuclear aralkylene, halo aralkylene, alkyleneoxyalkylene, aryleneoxyaralkylene, and saturated cycloalkylene, and mononuclear and binuclear arylene radicals; ($OR^4$) is selected from the group consisting of lower alkoxy radicals, and halogenated derivatives thereof; a has a value of 1 to 2, b has a value of 0 to 2, and the sum of $a+b$ has a value of 0 to 2, c has a value of 0.1 to 2.5, d has a value of 0 to 2, e has a value of 0 to 2, and the sum of $d+e$ has a value of 0 to 2, and f has a value of from 0.20 to 0.33.

References Cited

UNITED STATES PATENTS 3,170,891  2/1965  Speier _____ 260—46.5
3,318,898  5/1967  Boissieras et al. _____ 260—46.5
3,408,321  10/1968  Ashby _____ 260—46.5

SAMUEL H. BLECH, Primary Examiner

U.S. Cl. X.R.

117—123, 148, 161; 260—2, 18, 37, 75, 76, 77.5, 448.2, 448.8, 824